United States Patent
Rains, Jr. et al.

(10) Patent No.: US 10,497,337 B2
(45) Date of Patent: Dec. 3, 2019

(54) SYSTEMS AND METHODS TO PROVIDE CONFIGURATION DATA TO A SOFTWARE CONFIGURABLE LIGHTING DEVICE

(71) Applicant: ABL IP HOLDING LLC, Conyers, GA (US)

(72) Inventors: Jack C. Rains, Jr., Herndon, VA (US); Mark A. Black, Lawsonville, NC (US); David P. Ramer, Reston, VA (US); Rashmi Kumar Raj, Herndon, VA (US); Hampton Boone Maher, Washington, DC (US)

(73) Assignee: ABL IP HOLDING LLC, Conyers, GA (US)

( * ) Notice: Subject to any disclaimer, the term of this patent is extended or adjusted under 35 U.S.C. 154(b) by 325 days.

(21) Appl. No.: 15/210,328

(22) Filed: Jul. 14, 2016

(65) Prior Publication Data

US 2017/0018256 A1     Jan. 19, 2017

Related U.S. Application Data

(60) Provisional application No. 62/193,874, filed on Jul. 17, 2015.

(51) Int. Cl.
*G09G 3/00*   (2006.01)
*G09G 5/10*   (2006.01)
(Continued)

(52) U.S. Cl.
CPC ............ *G09G 5/10* (2013.01); *G09G 3/2096* (2013.01); *G09G 3/3406* (2013.01); *H05B 33/0857* (2013.01); *H05B 37/0218* (2013.01); *H05B 37/0227* (2013.01); *H05B 37/0245* (2013.01); *G09G 2320/0606* (2013.01); *G09G 2320/0626* (2013.01); *G09G 2320/0666* (2013.01); *G09G 2320/0693* (2013.01); *G09G 2360/144* (2013.01); *G09G 2370/02* (2013.01); *G09G 2370/022* (2013.01); *Y02B 20/46* (2013.01)

(58) Field of Classification Search
None
See application file for complete search history.

(56) References Cited

U.S. PATENT DOCUMENTS

| | | |
|---|---|---|
| 4,956,619 A | 9/1990 | Hornbeck |
| 5,184,114 A | 2/1993 | Brown |

(Continued)

OTHER PUBLICATIONS

International Search Report and Written Opinion of the International Searching Authority for International Application No. PCT/US2016/042284, dated Sep. 22, 2016, 16 pages.

(Continued)

*Primary Examiner* — Brian M Butcher
(74) *Attorney, Agent, or Firm* — RatnerPrestia

(57) ABSTRACT

An example of a virtual luminaire store allows a user to select an image or the like for a luminaire appearance and a set of performance parameters related to a virtual luminaire. Based on the user selection, a configuration information file is obtained and transmitted to a software configurable lighting device. The software configurable lighting device receives the transmitted file, stores the transmitted file and generates illumination in accordance with the configuration information from the file.

14 Claims, 5 Drawing Sheets

(51) Int. Cl.
*H05B 33/08* (2006.01)
*H05B 37/02* (2006.01)
*G09G 3/20* (2006.01)
*G09G 3/34* (2006.01)

(56) References Cited

U.S. PATENT DOCUMENTS

| | | | |
|---|---|---|---|
| 5,769,527 | A | 6/1998 | Taylor et al. |
| 6,111,560 | A | 8/2000 | May |
| 6,995,355 | B2 | 2/2006 | Rains, Jr. et al. |
| 7,675,500 | B2 | 3/2010 | Daly |
| 8,167,439 | B2 | 5/2012 | Yamada |
| 8,177,390 | B2 | 5/2012 | Miskin |
| 8,779,669 | B2 | 7/2014 | Ramer |
| 8,982,313 | B2 | 3/2015 | Escuti |
| 8,994,291 | B2 | 3/2015 | Ramer |
| 9,192,029 | B2 | 11/2015 | Marquardt et al. |
| 9,497,833 | B2 | 11/2016 | Marquardt |
| 2002/0021267 | A1 | 2/2002 | Walker et al. |
| 2002/0070914 | A1 | 6/2002 | Bruning et al. |
| 2003/0227416 | A1 | 12/2003 | Meitzler et al. |
| 2004/0095558 | A1 | 5/2004 | Whitehead |
| 2004/0100589 | A1 | 5/2004 | Ben-David |
| 2006/0181775 | A1 | 8/2006 | Willemsen et al. |
| 2007/0035706 | A1* | 2/2007 | Margulis ............... G03B 21/20 353/122 |
| 2007/0052660 | A1 | 3/2007 | Montbach |
| 2007/0164975 | A1 | 7/2007 | Lim et al. |
| 2009/0241390 | A1 | 10/2009 | Roberts |
| 2010/0117941 | A1 | 5/2010 | Schulz |
| 2011/0069960 | A1 | 3/2011 | Knapp et al. |
| 2011/0159929 | A1 | 6/2011 | Karaoguz et al. |
| 2011/0215725 | A1* | 9/2011 | Paolini ................. H05B 33/086 315/153 |
| 2012/0032874 | A1 | 2/2012 | Mukawa |
| 2012/0056556 | A1 | 3/2012 | Laski |
| 2012/0092735 | A1 | 4/2012 | Futterer |
| 2012/0092750 | A1 | 4/2012 | Kroll |
| 2013/0249404 | A1 | 9/2013 | Eckel |
| 2014/0058566 | A1 | 2/2014 | Rains |
| 2015/0085475 | A1 | 3/2015 | Ryu et al. |
| 2015/0085481 | A1 | 3/2015 | Ryu et al. |
| 2015/0264341 | A1 | 9/2015 | Seshadri et al. |
| 2015/0289344 | A1 | 10/2015 | Leadford et al. |
| 2015/0345724 | A1 | 12/2015 | Leadford et al. |
| 2016/0123541 | A1 | 5/2016 | Quilici et al. |
| 2016/0128140 | A1 | 5/2016 | Quilici et al. |
| 2016/0217749 | A1 | 7/2016 | Aggarwal |

OTHER PUBLICATIONS

"Beam. The smart projector that fits in any light socket", downloaded Oct. 20, 2016 from http://beamlabsinc.com/ 2016 Beam Labs BV, The Netherlands, 5 pages.

Amazon Launchpad, "Beam, the Smart Projector that Fits in Any Light Socket by Beam", downloaded on Oct. 20, 2016 from https://www.amazon.com/Beam-Smart-Projector-Light-Socket/dp/B017IKR2NM—Interst Based Ads 19906-2016, Amazon.com, Inc. or its affiliates, 5 pages.

Escuti et al., "Polarization-Indiependent LC Microdisplays Using Liquid Crystal Polarization Gratings: A viable Solution", Dept. of Electrical & Computer Engineering, North Carolina State University, Jul. 1, 2008, 30 pages.

Nersisyan et al., "Polarization Insensitive Imaging Through Polarization Gratings", Optics Express, vol. 17, No. 3, Feb. 2, 2009, pp. 1817-1830.

Kim et al., Wide-angle, nonmechanical beam steering using thin liquid crystal polarization gratings, Proc. of SPIE, vol. 7093, 12 pages.

Oh et al., "Polarization-Independent Modulation USing Standard Liquid Crystal Microdisplays and Polymer Polarization Gratings", Department of Electrical and comuter Engineering, North Carolina State University, 2008, 4 pages.

Heidenfeld et al, "Recent Progres in Arrayed Electrowetting Optics", OPN, 2009, 7 pages.

Hou et al., "A full description of a scalable microfabrication process for arrayed elecrowetting microprisms", Journal of Micromechanics and Microengineering, vol. 20, © 2010, 12 pages.

Komanduri et al., "Polarization-independent modulation for pijection displays using small-period L.C. polarization gratings", Journal of the Society for Information Display, vol. 15, No. 8, 2007, pp. 589-594.

McManamon et al., "A Review of Phased Array Steering for Narrow-Band Electrooptical Systems", Porceediings of the IEEE, vol. 97, No. 6, Jun. 2009, pp. 1078-1096.

Hsieh et al., "Sophisticated oil film geometries through incomplete electrical dewetting by feedback control and Fourier construction", Lab Chip, vol. 15, pp. 2615-2624, published May 7, 2015.

International Search Report and Written Opinion of the International Searching Authority for International Application No. PCT/US2016/042243, dated Nov. 16, 2016, 30 pages.

International Search Report and Written Opinion of the International Searching Authority for International Application No. PCT/US2016/042278, dated Nov. 29, 2016, 22 pages.

International Preliminary Report on Patentability for International Application No. PCT/US2016/042243, dated Jan. 23, 2018, 12 pages.

International Preliminary Report on Patentability for International Application No. PCT/US2016/042278, dated Jan. 23, 2018, 20 pages.

International Preliminary Report on Patentability for International Application No. PCT/US2016/042284, dated Jan. 23, 2018, 15 pages.

Non Final Office Action for U.S. Appl. No. 15/210,045, dated Oct. 5, 2018, 45 pages.

Non Final Office Action for U.S. Appl. No. 15/209,878, dated Oct. 4, 2018, 36 pages.

Final Office Actoin for U.S. Appl. No. 15/210,045 dated Feb. 26, 2019, 23 pages.

Notice of Allowance for U.S. Appl. No. 15/209,878, dated Feb. 25, 2019, 21 pages.

* cited by examiner

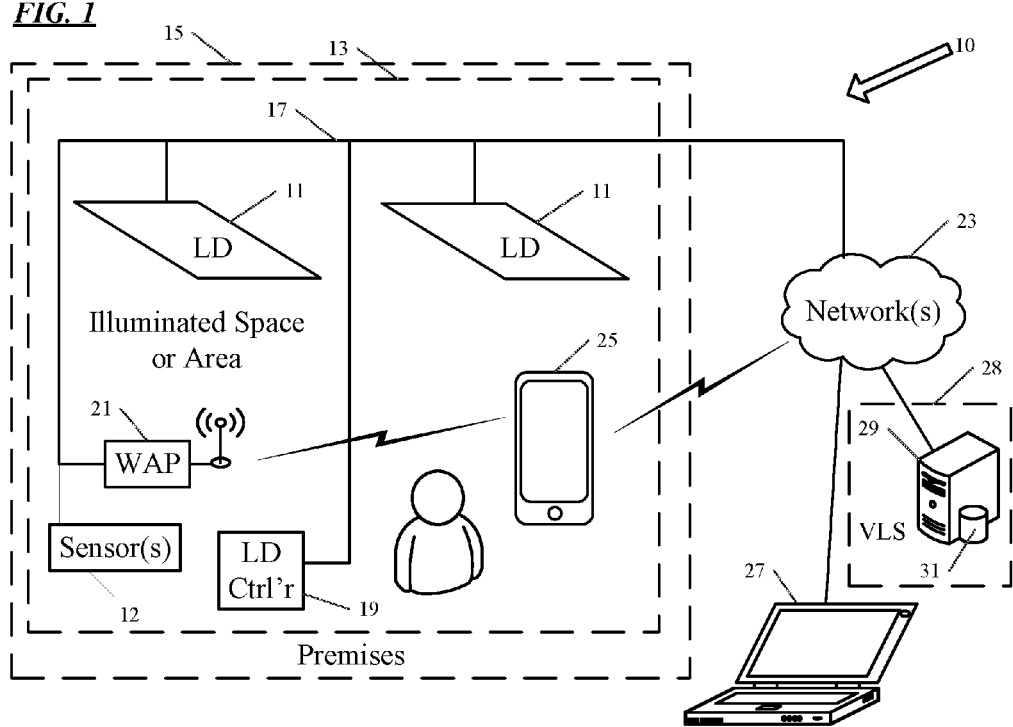
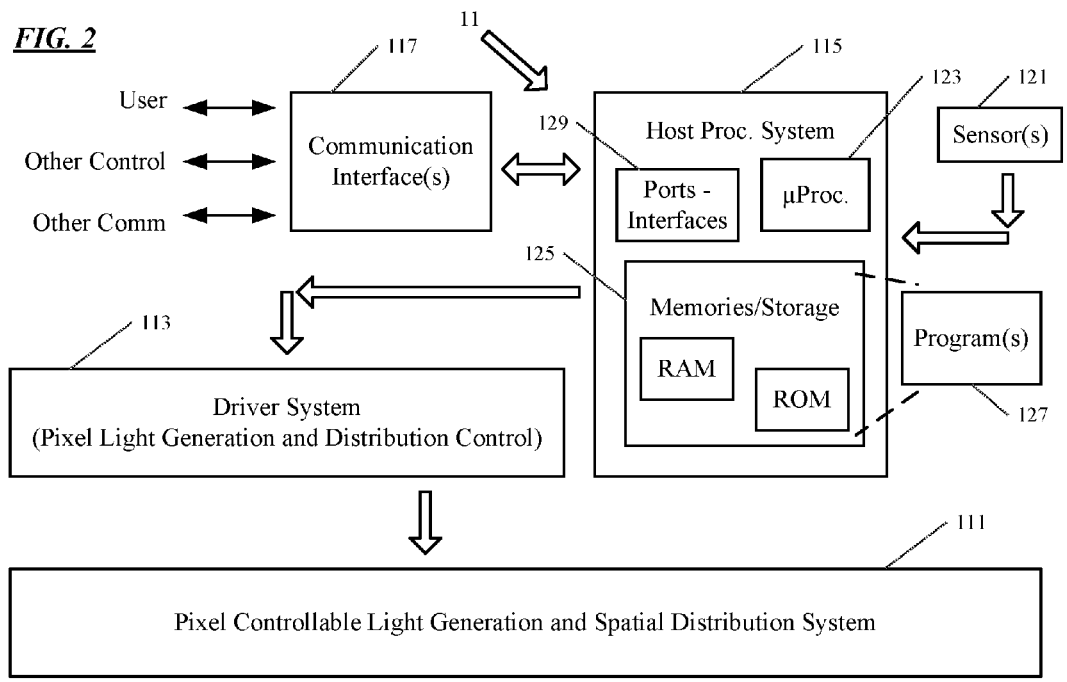

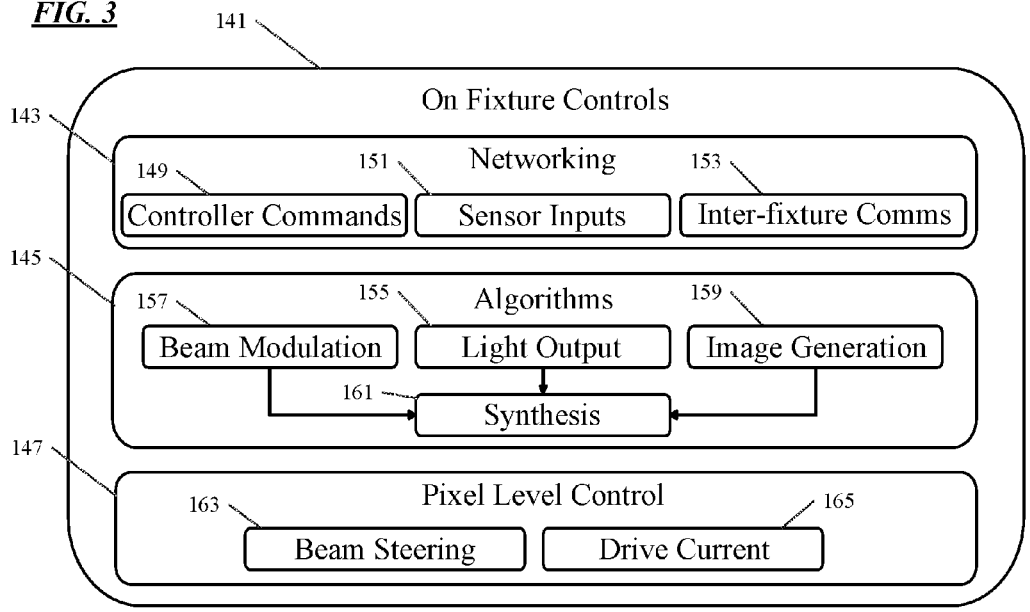
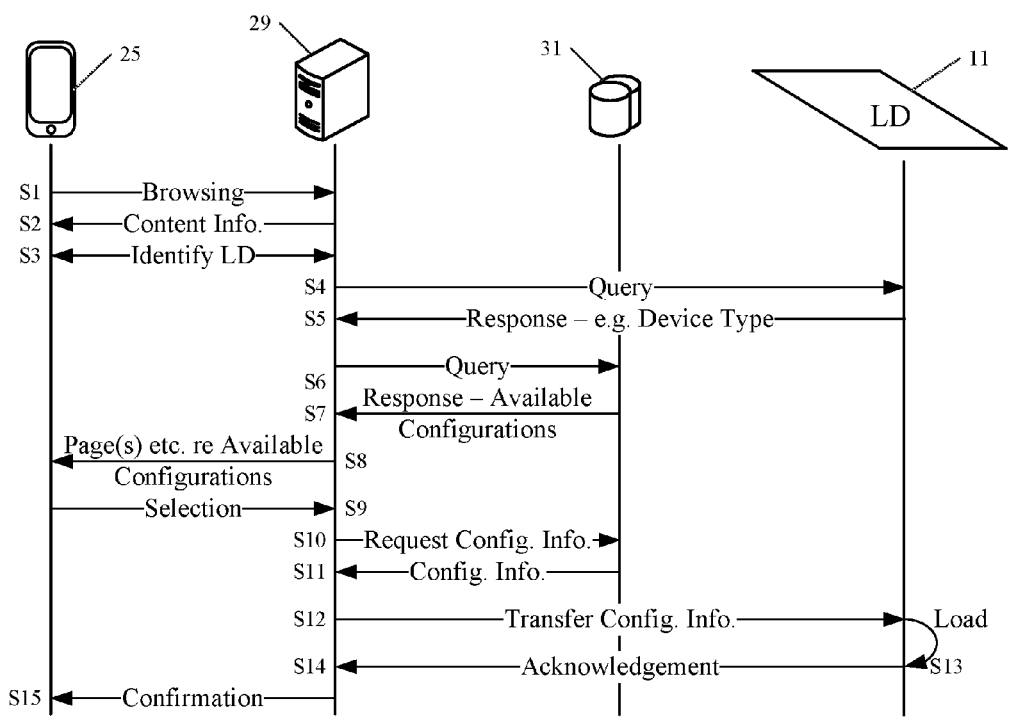

SYSTEMS AND METHODS TO PROVIDE CONFIGURATION DATA TO A SOFTWARE CONFIGURABLE LIGHTING DEVICE

CROSS-REFERENCE TO RELATED APPLICATION

This application claims priority of U.S. Provisional Patent Application No. 62/193,874, filed on Jul. 17, 2015 and entitled "Systems And Methods To Provide Configuration Data To A Software Configurable Lighting Device," the entire contents of which are incorporated herein by reference.

TECHNICAL FIELD

The present subject matter relates to techniques and equipment to provide configuration or setting information to a software configurable lighting device capable of appearing and/or distributing output light illumination like any of a variety of different lighting devices based on the information.

BACKGROUND

Electrically powered artificial lighting has become ubiquitous in modern society. Electrical lighting devices are commonly deployed, for example, in homes, buildings of commercial and other enterprise establishments, as well as in various outdoor settings.

In conventional lighting devices, the luminance output can be turned ON/OFF and often can be adjusted up or dimmed down. In some devices, e.g. using multiple colors of light emitting diode (LED) type sources, the user may be able to adjust a combined color output of the resulting illumination. The changes in intensity or color characteristics of the illumination may be responsive to manual user inputs or responsive to various sensed conditions in or about the illuminated space. The optical distribution of the light output, however, typically is fixed. Various different types of optical elements are used in such lighting devices to provide different light output distributions, but each type of device has a specific type of optic designed to create a particular light distribution for the intended application of the lighting device. The dimming and/or color control features do not affect the distribution pattern of the light emitted from the luminaire.

To the extent that multiple distribution patterns are needed for different lighting applications, multiple luminaires must be provided. To meet the demand for different appearances and/or different performance (including different distributions), a single manufacturer of lighting devices may build and sell thousands of different luminaires.

Some special purpose light fixtures, for example, fixtures designed for stage or studio type lighting, have implemented mechanical adjustments. Mechanically adjustable lenses and irises enable selectable adjustment of the output light beam shape, and mechanically adjustable gimbal fixture mounts or the like enable selectable adjustment of the angle of the fixture and thus the direction of the light output. The adjustments provided by these mechanical approaches are implemented at the overall fixture output, provide relatively coarse overall control, and are really optimized for special purpose applications, not general lighting.

There have been more recent proposals to develop lighting devices offering electronically adjustable light beam distributions, using a number of separately selectable/controllable solid state lamps or light engines within one light fixture. In at least some cases, each internal light engine or lamp may have an associated adjustable electro-optic component to adjust the respective light beam output, thereby providing distribution control for the overall illumination output of the fixture.

Although the more recent proposals provide a greater degree of distribution adjustment and may be more suitable for general lighting applications, the outward appearance of each lighting device remains the same even as the device output light distribution is adjusted. There may also be room for still further improvement in the degree of adjustment supported by the lighting device.

There also have been proposals to use displays or display-like devices mounted in or on the ceiling to provide variable lighting. The Fraunhofer Institute, for example, has demonstrated a lighting system using luminous tiles, each having a matrix of red (R) LEDs, green (G), blue (B) LEDs and white (W) LEDs as well as a diffuser film to process light from the various LEDs. The LEDs of the system were driven to simulate or mimic the effects of clouds moving across the sky. Although use of displays allows for variations in appearance that some may find pleasing, the displays or display-like devices are optimized for image output and do not provide particularly good illumination for general lighting applications. A display typically has a Lambertian output distribution over substantially the entire surface area of the display screen, which does not provide the white light intensity and coverage area at a floor or ceiling height offered by a similarly sized ceiling-mounted light fixture. Liquid crystal displays (LCD) also are rather inefficient. For example, backlights in LCD televisions have to produce almost ten times the amount of light that is actually delivered at the viewing surface. Therefore, any LCD displays that are to be used as lighting products need to be more efficient than typical LCD displays for the lighting device implementation to be commercially viable.

SUMMARY

The various examples disclosed herein relate to techniques, equipment and articles to provide configuration information to a software configurable lighting device, e.g. via a network.

A system, for example, includes a software configurable lighting device, a computer and a database of configuration information files accessible to a processor of the computer. The software configurable lighting device includes: a light generation and distribution system; a memory; a programmable controller; and a communication interface. The light generation and distribution system is configurable at a pixel level with respect to light output parameters including: lighting intensity; light color characteristic; and spatial modulation. The memory is configured to store lighting device configuration information. The programmable controller is coupled to the light generation and distribution system and to have access to the memory. In addition, the programmable controller is configured to set the light output parameters in accordance with data processed by the controller in accordance with a selected lighting device configuration information from the memory.

In the system example, the computer includes a processor and a communication interface coupled to the processor. In one example, the processor configures the computer to load one or more lighting device configuration information files from the database, including a file of the selected lighting device configuration information, into the memory of the software configurable lighting device.

In one example, a method involves receiving a selection of a lighting device configuration. Based on the received selection, a file of lighting device configuration information is obtained from among files of a database of configuration information files and transmitted from a server coupled to the database through a communication network, for loading into a software configurable lighting device. In this example, each configuration file includes data to set the light output parameters of the software configurable lighting device with respect to light intensity, light color characteristic and spatial modulation. Among the other examples included below is a description of an article of manufacture including a non-transitory machine readable medium and programming embodied in the medium that configures a computer to implement functions similar to the steps of the method in this example.

In another example, a method includes steps of: receiving a configuration file via a communication network in a software configurable lighting device; storing the received configuration file in a memory of the software configurable lighting device; and setting the light output parameters of the software configurable lighting device in accordance with the data in the configuration information file stored in the memory. In this example, the received configuration file includes data to set the light output parameters of the software configurable lighting device with respect to light intensity, light color characteristic and spatial modulation. Among the other examples included below is a description of an article of manufacture including a non-transitory machine readable medium and programming embodied in the medium that configures a computer to implement functions similar to the steps of the method in this example.

The various examples below also include a description of an article of manufacture that includes a machine readable medium and lighting device configuration information embodied in the medium to configure a software configurable lighting device to set light output parameters comprising: (1) light intensity; (2) light color characteristic; and (3) spatial modulation; in accordance with the lighting device configuration information.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 is a high-level functional block diagram of a system for providing configuration or setting information to a software configurable lighting device, based on a user selection.

FIG. 2 is a high-level functional block diagram of a software configurable lighting device.

FIG. 3 is a high-level diagram of the control functions that may be implemented in a software configurable lighting device, like that of FIG. 2.

FIG. 4 is a ping-pong chart type signal flow diagram, of an example of a procedure for loading configuration information to a software configurable lighting device, in a system like that of FIG. 1.

DETAILED DESCRIPTION

Figure 5:
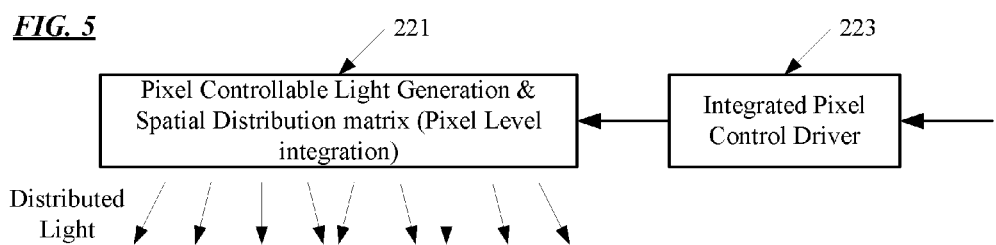
FIGS. 5 to 6 are examples, in functional block diagram form, of several implementations of the pixel controllable light generation and spatial distribution system, of in a software configurable lighting device, like that of FIG. 2.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to providing a selected file of configuration information, e.g. via a network, to a software configurable lighting device. Based on the received configuration file, the software configurable lighting device operates a pixel controllable light generation and spatial distribution system in order to produce illumination within a space and/or one or more images via an output of the software configurable lighting device. In this way, a lighting device may assume the appearance and performance of any one of some number of specific lighting devices and/or provide standardized or customized imagery. A virtual luminaire store provides an interactive source to provide the configuration information for a selected luminaire representation and a selected illumination light output performance.

Reference now is made in detail to the examples illustrated in the accompanying drawings and discussed below. FIG. 1 illustrates a system 10 for providing configuration or setting information to a software configurable lighting device (LD) 11, e.g. based on a user selection. The software configurable lighting device 11, as well as some other elements of system 10, are installed within a space or area 13 to be illuminated at a premises 15. The premises 15 may be any location or locations serviced for lighting and other purposes by such system of the type described herein. Most of the examples discussed below focus on building installations, for convenience, although the system may be readily adapted to outdoor lighting. Hence, the example of system 10 provides lighting, imagery and possibly other services in a number of service areas in or associated with a building, such as various rooms, hallways, corridors or storage areas of a building and an outdoor area associated with a building. Any building forming or at the premises, for example, may be an individual or multi-resident dwelling or may provide space for one or more enterprises and/or any combination of residential and enterprise facilities.

The system elements, in a system like system 10 of FIG. 1, may include any number of software configurable lighting devices 11 as well as one or more lighting controllers 19. Lighting controller 19 may be configured to provide control of lighting related operations (e.g., ON/OFF, intensity, brightness) of lighting device 11. Alternatively, or in addition, lighting controller 19 may be configured to provide control of the software configurable aspects of lighting device 11, as described in greater detail below. That is, lighting controller 19 may take the form of a switch, a dimmer, or a smart control panel including a user interface depending on the functions to be controlled through device 19. The lighting system elements may also include one or more sensors used to control lighting functions, such as occupancy sensors, ambient light sensors and light or temperature feedback sensors that detect conditions of or produced by one or more of the lighting devices. If provided, the sensors may be implemented in intelligent standalone system elements 12, or the sensors may be incorporated in one of the other system elements, such as lighting device 11 and lighting controller 19.

The on-premises system elements 11, 12, 19, in a system like system 10 of FIG. 1, are coupled to and communicate via a data network 17 at the premises 15. The data network 17 in the example also includes a wireless access point (WAP) 21 to support communications of wireless equipment at the premises. For example, the WAP 21 and network 17 may enable a user terminal for a user to control operations of lighting device 11. Such a user terminal is depicted in FIG. 1, for example, as a mobile device 25 within premises 15, although any appropriate user terminal may be utilized. However, the ability to control operations of lighting device 11 may not be limited to a user terminal accessing data network 17 via WAP 21 within premises 15. Alternatively, or in addition, a user terminal such as laptop 27 located outside premises 15, for example, may provide the ability to control operations of lighting device 11 via one or more other networks 23 and the on-premises network 17. Network(s) 23 includes, for example, a local area network (LAN), a metropolitan area network (MAN), a wide area network (WAN) or some other private or public network, such as the Internet.

For lighting operations, the system elements for a given service area (11, 12 and/or 19) are coupled together for network communication with each other through data communication media to form a portion of a physical data communication network. Similar elements in other service areas of the premises are coupled together for network communication with each other through data communication media to form one or more other portions of the physical data communication network at the premises 15. The various portions of the network in the service areas in turn are coupled together to form a data communication network at the premises, for example to form a LAN or the like, as generally represented by network 17 in FIG. 1. Such data communication media may be wired and/or wireless, e.g. cable or fiber Ethernet, Wi-Fi, Bluetooth, or cellular short range mesh. In many installations, there may be one overall data communication network 17 at the premises. However, for larger premises and/or premises that may actually encompass somewhat separate physical locations, the premises-wide network 17 may actually be built of somewhat separate but interconnected physical networks utilizing similar or different data communication media.

System 10 also includes server 29 and database 31 accessible to a processor of server 29. Although FIG. 1 depicts server 29 as located outside premises 15 and accessible via network(s) 23, this is only for simplicity and no such requirement exists. Alternatively, server 29 may be located within premises 15 and accessible via network 17. In still another alternative example, server 29 may be located within any one or more system element(s), such as lighting device 11, lighting controller 19 or sensor 12. Similarly, although FIG. 1 depicts database 31 as physically proximate server 29, this is only for simplicity and no such requirement exists. Instead, database 31 may be located physically disparate or otherwise separated from server 29 and logically accessible by server 29, for example via network 17.

Database 31 is a collection of configuration information files for use in conjunction with software configurable lighting device 11. For example, each configuration information file within database 31 includes an image and at least one pixel level setting for at least one of beam distribution or beam shaping. In one example, a selected configuration information file from among the collection of configuration information files is loaded into a memory of software configurable lighting device 11, and software configurable lighting device 11 is configured to set light output parameters in accordance with the selected configuration information file. The light output parameters include, for example, light intensity, light color characteristic and spatial modulation. In this one example, the included image is a representation of a luminaire and the at least one pixel level setting configures lighting device 11 to emit light for general illumination having a light distribution corresponding to a light distribution of an output of the represented luminaire. That is, the selected configuration information file enables lighting device 11 to achieve a specific appearance and performance, e.g. lighting device 11 appears to be the represented luminaire and performs like the represented luminaire. Thus, the combination of server 29 and database 31 represents a "virtual luminaire store" (VLS) 28 or a repository of available configurations that enable the lighting device 11 to "become" any one of a number of luminaires represented by the available configurations.

It should be noted that the output performance parameters need not always or precisely correspond optically to the represented luminaire. For example, the image may represent an image of one physical luminaire selected for its appearance whereas the performance parameters may be those of a different physical luminaire or even an independently determined performance intended to achieve a desired illumination effect in area 13. The performance, for example, may conform to or approximate that of a physical luminaire or may be an artificial construct for a luminaire not ever built or offered for sale in the real world.

It should also be noted that, while various examples describe loading a single configuration information file onto lighting device 11, this is only for simplicity. Lighting device 11 may receive one, two or more configuration information files and each received file may be stored within lighting device 11. In such a situation, lighting device 11 may, at various times, operate in accordance with configuration information in any one of multiple files, e.g. operate in accordance with first configuration information during daylight hours and in accordance with second configuration information during nighttime hours or in accordance with different file selections from a user operator at different times. Alternatively, lighting device 11 may only store a single configuration information file. In this alternative situation, lighting device 11 may still operate in accordance with various different configuration information, but only after receipt of a corresponding configuration information file which replaces any previously received files.

An example of an overall methodology will be described later with respect to FIG. 4. Different components in a system 10 like that of FIG. 1 will implement methods with or portions of the overall methodology, albeit from somewhat different perspectives. It may be helpful at this point to discuss, at a high level, how various elements of system 10 interact to allow a lighting designer or other user to select a particular image and performance parameters to be sent to software configurable lighting device 11.

In one example, the user utilizes mobile device 25 or laptop 27 to access virtual luminaire store 28 provided on/by server 29 and database 31. Although the examples reference mobile device 25/laptop 27, this is only for simplicity and such access may be via LD controller 19 or any other appropriate user terminal device. Virtual luminaire store 28 provides, for example, a list or other indication of available images that may be displayed either by software configurable lighting devices generally and/or a particular lighting device 11. Virtual luminaire store 28 also provides, for example, a list or other indication of potential performance parameters under which software configurable lighting devices generally and/or lighting device 11 particularly may operate. Alternatively, or in addition, virtual luminaire store 28 may allow the user to provide a customized image and/or customized performance parameters as part of the browsing/selection process. As part of the browsing/selection process, the user, for example, may identify the particular lighting device 11 or otherwise indicate a particular type of lighting device for which a subsequent selection relates. In turn, virtual luminaire store 28, for example, may limit what is provided to the user (e.g., the user is only presented with images and performance parameters related to the particular lighting device 11). The user, as part of the browsing/selection process, selects a desired image and desired performance parameters to be sent to lighting device 11. Based on the user selection, server 29 transmits a configuration information file to lighting device 11. The configuration information file includes, for example, the selected image and the selected performance parameters.

It may also be helpful to discuss, at a high level, how lighting device 11 interacts with other elements of system 10 to receive a file containing configuration information and how lighting device 11 utilizes the received file to display an image and operate in accordance with performance parameters. In a method example from the device-centric perspective, the lighting device 11 receives a configuration information file via network 17, such as the configuration information file transmitted by server 29 in the previous example. The received configuration information file includes, for example, data to set the light output parameters of lighting device 11 with respect to light intensity, light color characteristic and spatial modulation. Lighting device 11 stores the received configuration file, e.g. in a memory of lighting device 11. In this further example, lighting device 11 sets light output parameters in accordance with the data included in the configuration information file. The data contained in the configuration information file in a specific example includes an image for display by lighting device 11 as well as at least one pixel level setting for at least one of beam distribution or beam shaping, e.g. as spatial modulation setting information. In this way, lighting device 11 stores the received file and can utilize configuration information contained in the file to display an image and control the performance of lighting device 11.

As outlined above, the lighting device configuration information, e.g. contained in a file sent to/loaded into a software configurable lighting device, includes performance settings for light output parameters including (1) light intensity; (2) light color characteristic; and (3) spatial modulation, for the illumination light output of the device. In the examples, the lighting device configuration information also includes an image for display by the lighting device or other similar data to cause the software configurable lighting device to present a representation of a selected virtual luminaire.

The image or other type of information defining the visible virtual luminaire representation may correspond to an actual physical luminaire, e.g. so that the software configurable lighting device presents a representation of a particular physical lighting device of one manufacturer. The on-line store implemented by server 29 and database 31 in the example of FIG. 1 therefore would present content showing and/or describing a virtual luminaire approximating the appearance of the physical lighting device. In that regard, the store may operate much like the manufacturer's on-line catalog for regular lighting devices allowing the user to browse through a catalog of virtual luminaires, many of which represent corresponding physical devices. However, virtual luminaire store 28 may similarly offer content about and ultimately deliver information defining the visible virtual representations of other luminaires, e.g. physical lighting devices of different manufacturers, or of lighting devices not actually available as physical hardware products, or even representations that do not appear like otherwise conventional lighting devices.

Virtual luminaire store 28 allows a lighting designer or other user to select from any such available visible representation for presentation via the software configurable lighting device. Virtual luminaire store 28 may also offer interactive on-line tools to customize any available visible representation for presentation via the software configurable lighting device 11 and/or interactive on-line tools to build an entirely new representation.

For convenience, the description of examples most often describes the chosen image or the like as a representation of one luminaire or lighting device. A single software configurable lighting device 11, however, may present representations of two or more luminaires or lighting devices in one display. Virtual luminaire store 28 therefore can offer options to select multiple luminaires, e.g. so that one software configurable lighting device may simultaneously display a representation of two or more of the same or different virtual luminaires (e.g. two similar downlights or a downlight and a wall wash). Regardless of image selection, sets of performance parameters may approximate output of one, two or more luminaires. Also, the selection of a luminaire representation often may include a selection of a representation for appearance around or on other parts of the device output surface. For example, consider a selection of an appearance similar to a 6-inch circular downlight type physical luminaire. The output of the software configurable lighting device 11 often is larger, e.g. 2-feet by 2-feet (2×2). In such a case, the user can select where on the 2×2 output of device 11 the representation of the selected downlight should be displayed as well as the appearance of the rest of the output (where device 11 is not showing the downlight image). The user, for a ceiling mounted example, may choose for the device 11 to display a representation of a common ceiling tile around the downlight, and if so, select features such as color and texture of the displayed tile. Of course, virtual luminaire store 28 may offer a variety of other options for the surrounding display area. The image or the like sent to device 11 as a result of such selections therefore will sometimes include a representation of a virtual luminaire as well as a surrounding area.

Virtual luminaire store 28 also allows for selection of a set of performance settings for light output parameters that, at least when uploaded and used in the software configurable lighting device 11, will be associated with the selected luminaire representation. In many cases, the selected performance settings for light output parameters will directly correspond to a luminaire representation selected from content sent by virtual luminaire store 28. For example, a selected set of settings for illumination performance will cause the software configurable lighting device 11 to produce an illumination output the same as or similar to that offered by a physical lighting device represented by the selected display function on the software configurable lighting device. In such an example, the lighting designer or other user might select a visible representation for presentation that corresponds to or is an image of a physical lighting device and by default or further interaction select an illumination output performance the same as or similar to the typical performance of that particular physical lighting device. In that case, performance settings for the light output parameters (1) light intensity, (2) light color characteristic and (3) spatial modulation would instruct the software configurable lighting device 11 to output illumination light to provide illumination performance by the software configurable lighting device 11 like that of the particular physical lighting device.

The virtual luminaire store 28 in our examples, however, offers other options for selecting illumination performance. For example, the lighting designer or other user might select a performance that corresponds to a physical lighting device that is at least somewhat different from performance of the physical lighting device (or the customized lighting device or newly created luminaire) chosen to be represented by the display presentation function of the software configurable lighting device 11. For example, the user might select a representation of a 2×2 fluorescent fixture and select an illumination output performance approximating that of a 9-inch circular downlight (or vice versa). As another example, a lighting designer may select a representation of a luminaire by one manufacturer for aesthetic reasons but select a superior illumination performance characteristic approximating that of a similar physical lighting device by another manufacturer. Of course, independent selection of a luminaire representation and illumination output performance support a multitude of combinations. Other tools may be available via virtual luminaire store 28 to adjust a selected illumination performance characteristic that may initially have corresponded to that of a physical lighting device and/or to create an entirely new illumination performance characteristic, to suit the designer's requirements for a particular job or lighting application.

The preceding examples focused on selection of one set of lighting device configuration information, for the luminaire representation and the illumination performance characteristic. Similar procedures via virtual luminaire store 28 will enable selection and installation of one or more additional sets of lighting device configuration information, e.g. for use at different times or for user selection at the premises (when the space is used in different ways).

Also, the preceding examples focus on presentation and illumination performance when device 11 is emitting illumination light, i.e. as if the virtual luminaire is turned ON; and the examples focused on selections appropriate for the ON state. However, the software configurable lighting device 11 can provide a different output, and the virtual luminaire store 28 provides interactive selections, for configuring device output for the virtual luminaire in the OFF state. For example, the store may offer a selection in which the representation shows a selected virtual luminaire in an OFF state (e.g., a darkened luminaire) and any selected surrounding area in a lower light state similar to when a physical lighting device is OFF. Other OFF state options can be offered by virtual luminaire store 28 and implemented on device 11 via configuration information in the file. For example, virtual luminaire store 28 may allow the user to select any desired image or a sequence of images or video for presentation when the virtual luminaire is to be OFF. As just a few such examples, the output may represent a blank ceiling tile (as if virtual luminaire disappeared), a selected photograph, a selected image of an artwork or even a video. Once selected via virtual luminaire store 28, the image, video or other data for the OFF-state representation is sent from store 28 to the software configurable lighting device, in the same or another file.

While FIG. 1 depicts an example of an overall system 10 in which software configurable lighting device 11 may be utilized, FIG. 2 depicts an example of the structure of lighting device 11, FIG. 3 depicts an example of controls utilized within lighting device 11, and FIG. 4 depicts an example of interactions with virtual luminaire store 28 (e.g., server 29 and database 31) that result in lighting device 11 configured to appear and perform as a selected luminaire.

FIG. 2 depicts an example of a lighting device 11, including high layer logic and communications elements, a pixel controllable light generation and spatial light distribution (spatial modulation) system 111 configured to simultaneously provide general illumination and display functionalities and one or more drivers (shown as a system) 113.

As shown in FIG. 2, the lighting device 11 includes a pixel controllable light generation and pixel controllable spatial light distribution system 111, a driver system 113, a host processing system 115, one or more sensors 121 and one or more communication interface(s) 117. Apparatuses implementing functions like those of device 11 may take other forms. In some examples, some components attributed to the lighting device may be separated from the pixel controllable light generation and spatial distribution system 111. For example, an apparatus may have all of the above hardware components on a single hardware device as shown or in different somewhat separate units. In a particular example, one set of the hardware components may be separated from system 111, such as the host processing system 115 and may run several systems, such as the driver system 113 from a remote location. Also, one set of intelligent components, such as the microprocessor 123, may control/drive some number of driver systems 113 and/or light generation and distribution systems 111.

In an example, the microprocessor 123 receives via one or more of communication interfaces 117 a configuration file that indicates a user selection of a virtual luminaire appearance and a light distribution to be provided by device 11. The microprocessor 123 may store the received configuration file in memories/storage 125. Each configuration file includes software control data to set the light output parameters of the software configurable lighting device with respect to light intensity, light color characteristic and spatial modulation. The respective light output parameters set the output for the image display and general lighting distribution. The microprocessor 123, by accessing programming 127 and using software control data in the memory 125, controls operation of the driver system 113 and other operations of the lighting device 11. For example, the microprocessor 123 obtains an image selection of a luminaire and a general lighting distribution selection as software control data from a configuration file. Using the software control data, the microprocessor 123 controls the driver system 113 to present, via the controllable system 111, an image output based on the image selection. The microprocessor 123 also controls the driver system 113, based on the software control data, to emit light for general illumination having the selected light distribution. The selected light distribution may be a custom light distribution disassociated from the selected appearance image or may be a light distribution commonly associated with a selected luminaire.

The controllable system 111 includes controllable light source(s) and spatial modulators. At this time it may be appropriate to explain some of the terms that will be frequently referenced throughout the discussion of examples. For example, the light sources in the controllable system are arranged as a matrix of pixel light sources. A pixel light source electrically controllable with respect to one or more light output parameters comprising light intensity or light color characteristic. In some examples, each of the pixel light sources are individually controllable in response to control signals from the driver system 113.

The source may use a single light generator and an intermediate pixel level control mechanism. For example, the light generator may be a backlight system, and the pixel level control of intensity and color characteristics may be implemented with an liquid crystal display (LCD) type pixel matrix. The backlight may utilize one or more emitters and a waveguide or other distributor to supply light to the controllable pixels of the LCD matrix. As another example, the lighting device may use a source similar to a projection TV system, e.g. with a modulated light generation device or system and a digital micro-mirror (DMD) to distribute light modulated with respect to intensity and color characteristic across the projection surface. In the projection example, the source pixels are pixels formed on the projection surface. Other examples below utilize individual source pixels that directly incorporate light emitters within each controllable source pixel.

The spatial modulators utilize components usable to provide light distribution modulation functions. Techniques for spatial light modulation include the use of electrically controllable optical properties such as refraction, reflection, diffraction, scattering, etc. or combinations of such properties. The spatial modulators may incorporate one or more technologies such as micro/nano-electro-mechanical systems (MEMS/NEMS) based dynamic optical beam control that may be active control using one or more controllable lensing, reflectors and mirrors; electrowetting based dynamic optical beam control; microlens based passive beam control; passive control using segment control (X-Y area and pixels), holographic films, and/or LCD materials. Of course, these modulation technologies are given by way of non-limiting examples, and other modulation techniques may be used. Other techniques, such as 3 dimensional (3D) techniques, may be utilized to provide enhanced image display and general illumination distributions. It is envisioned that different display image presentation techniques that allow viewers in different locations of a space may view a lighting device and see different attributes of the lighting device. For example, a view directly beneath the lighting device may only see in the displayed image the bezel surrounding a light source, such as a light bulb, of the selected image of a luminaire, while another viewer some distance away may see a side view image of the selected image of the luminaire. Examples of such displays and display techniques may be provided by Zebra Imaging of Austin, Tex., and Leia Inc. of Menlo Park, Calif.

The spatial modulators also may be arranged as a matrix of pixels in which a pixel spatial light modulator is optically coupled to process light from one or more pixels of the pixel light source. Each pixel spatial light modulator, for example, is configured to be electrically controllable with respect to at least one of beam shape or beam distribution (i.e. steering) of light from the pixel light source. In some of the examples, the individual pixel spatial modulators in the spatial modulator array are also individually controllable in response to control signals from the driver system 113. The number of pixel light sources in the light source matrix of pixels does not have to correspond to the number of pixel spatial modulators in the spatial modulator array of pixels. For example, the number of pixel light sources may be 790,000 and the number of pixel spatial modulators in the spatial modulator array of pixels may be 200000 (i.e., a ratio of 4 to 1). Alternatively, the light source matrix of pixels may be a single (i.e., one) light source that provides light to the spatial modulators. In other examples, the ratio of light source pixels to spatial modulator pixels may be 1:1, 1:4, 2:1, 1:2, 3:1 or some other ratio that provides desired functionality and features.

The spatial modulators (not shown in this example) are controllable at the individual pixel levels to control a spatial distribution of light generated by one or more pixel light sources. In some examples, a pixel includes both a light source pixel and a spatial modulation pixel. There can also be examples where a combination of pixel matrices may be combined for different image generation and general illumination purposes. Spatial distribution, also referred to as angular distribution, spatial modulation, and/or light distribution, refers to spatial characteristic(s) of the output of light from a lighting device.

Where there is a source pixel corresponding to each spatial modulator pixel, or each pixel includes both a controllable source and a spatial modulator each of the combination of the source and the spatial modulator may be thought of a one combined pixel. In such cases, the pixel spatial light modulator(s) of the controllable system 111 in some examples, is configured to process light from the light source of the pixel and is electrically controllable in response to commands from the processor with respect to at least one of beam shape or beam distribution of light from the pixel light source. For example, the microprocessor 123, by accessing programming 127 in the memory 125, controls operation of the driver system 113 and other operations of the lighting device 11. In the examples, the microprocessor 123 processes data retrieved from the memory 123 and/or other data storage, and responds to light output parameters in the retrieved data to control the light generation and distribution system 111. The light output parameters may include light intensity, light color characteristics, spatial modulation, spatial distribution and the like.

Spatial distribution is influenced by different control parameters related to the manner in which generated light leaves the spatial modulator pixel, such as the angle (also referred to as beam steering), a beam shape, time period, and the like. The generated light may also take the form of light for general illumination, such as task lighting, area lighting, focal point lighting (e.g., illuminating a painting on a wall or a niche), mood lighting, and the like, as well as image generation. Image generation may be the generation of a real-world scene, such as clouds, lighting device, objects, colored tiles, photographs, videos and the like, or computer-generated images, such as graphics and the like. In other examples, the image will be a representation of or include a representation (with surrounding other imagery) of a discernible lighting device. The lighting device image, for example, may depict a conventional fixture or type of actual luminaire.

Examples of different arrangements of the light source pixels and the spatial modulator pixels are described in more detail with reference to FIGS. 5-6. For example, a light source pixel in the matrix of light source pixels includes at least one pixel light source. In other examples, a pixel may be an integrated pixel that includes at least one pixel light source and at least one pixel spatial light modulator, and that is responsive to integrated controls.

Examples of a pixel light source include planar light emitting diodes (LEDs) of different colors; a micro LED; organic LEDs of different colors; pixels of an organic LED display; LEDs of different colors on gallium nitride (GaN) substrates; nanowire or nanorod LEDs of different colors; photo pumped quantum dot (QD) LEDs of different colors; plasmonic LEDs of different colors; pixels of a plasma display; laser diodes of different colors; micro LEDs of different colors; resonant-cavity (RC) LEDs of different colors; Super luminescent Diodes (SLD) of different colors, and photonic crystal LEDs of different colors. In addition to typical cellular plasma arrays used in televisions or monitors, plasma display technologies may include: plasma tube array (PTA) display technology from Shinoda Plasma Co., Ltd. or a plasma spherical array by Imaging Systems Technology (IST) in Toledo, Ohio. As will be described in more detail with reference to FIGS. 5-6, examples of a pixel spatial light modulator are configured to process light from the light source of the pixel and are electrically controllable with respect to at least one of beam shape or beam distribution of light from the pixel light source.

For convenience, the description of examples most often describes the chosen image or the like as a representation of one luminaire, fixture or lighting device. A single software configurable lighting device 11, however, may present representations of one, two or more luminaires or lighting devices in one display. Regardless of the selected image, sets of performance parameters may approximate output of one, two or more luminaires. Also, the selection of a luminaire representation often may include a selection of a representation for appearance around or on other parts of the device output surface. For example, consider a selection of an appearance similar to a 6-inch circular downlight type physical luminaire. The output of the software configurable lighting device 11 often is larger, e.g. 2-feet by 2-feet (2×2). In such a case, the user can select where on the 2×2 output of device 11 the representation of the selected downlight should be displayed as well as the appearance of the rest of the output (where device 11 is not showing the downlight image). The user, for a ceiling mounted example, may choose for the device 11 to display a representation of a common ceiling tile around the downlight, and if so, select features such as color and texture of the displayed tile.

In addition, the device 11 is not size restricted. For example, each device 11 may be a standard size, e.g., 2-feet by 2-feet (2×2), 2-feet by 4-feet (2×4), or the like, and arranged like tiles for larger area coverage. Alternatively, the device 11 may be a larger area device that covers a wall, a part of a wall, part of a ceiling, an entire ceiling, or some combination of portions or all of a ceiling and wall.

Also, the examples focus on presentation and illumination performance when device 11 is emitting illumination light, i.e. as if the virtual luminaire is turned ON. However, the software configurable lighting device 11 can provide a different output for the virtual luminaire in the OFF state. For example, the device 11 may display a representation of a selected virtual luminaire in an OFF state (e.g., a darkened luminaire) and any selected surrounding area in a lower light state similar to when a physical lighting device is OFF. Other OFF state options can be implemented on device 11 via configuration information. For example, the configurable device may output any desired image or a sequence of images or video for presentation when the virtual luminaire is to be OFF. As just a few such examples, the output may represent a blank ceiling tile (as if virtual luminaire disappeared), a selected photograph, a selected image of an artwork or even a video.

The host processing system 115 provides the high level logic or "brain" of the device 11. In the example, the host processing system 115 includes data storage/memories 125, such as a random access memory and/or a read-only memory, as well as programs 127 stored in one or more of the data storage/memories 125. The host processing system 115 also includes a central processing unit (CPU), shown by way of example as a microprocessor (μP) 123, although other processor hardware may serve as the CPU.

The host processing system 115 is coupled to the communication interface(s) 117. In the example, the communication interface(s) 117 offer a user interface function or communication with hardware elements providing a user interface for the device 11. The communication interface(s) 117 may communicate with other control elements, for example, a host computer of a building and control automation system (BCS). The communication interface(s) 117 may also support device communication with a variety of other systems of other parties, e.g. the device manufacturer for maintenance or an on-line server, such as server 29, for downloading of virtual fixture configuration data.

The host processing system 115 is coupled to sensor(s) 121 integrated within the device. As with external sensor(s) 12 of FIG. 1, integrated sensor(s) 121 may include one or more sensors related to the operation of lighting device 11 (e.g., occupancy, ambient light, light or temperature feedback). Sensor(s) 121, for example, utilize ports/interfaces 129 to deliver one or more signals related to sensed conditions to host processing system 115.

The host processing system 115 also is coupled to the driver system 113. The driver system 113, which may be referred to as the pixel light generation and distribution control system. The driver system, or driver, 113 is coupled to the pixel controllable light generation and spatial distribution system (i.e., "controllable system") 111 to control at a pixel level light generation by the controllable system 111. The driver 113 also controls the pixel level spatial distribution of the generated light.

The host processing system 115 and the driver system 113 provide a number of control functions for controlling operation of the lighting device 11. FIG. 3 is a high-level diagram of the control functions that may be implemented in a software configurable lighting device, like that of FIG. 2. For example, the On Fixture Controls 141 of the host processing system 115 and the driver system 113 encompass three functional areas of networking 143, algorithms 145 and pixel level control 147. Different aspects of each of the three functional areas may overlap into other functional areas, for example, some of the pixel level control 147 may be implemented at, or limited at, the networking 143 functional area. But for the ease of explanation, it will be presumed that the different functions are distinct and confined to the respective functional area.

The networking functional area 143 includes controller commands 149, sensor inputs 151 and inter-fixture communications (i.e., "comms") 153. The inter-fixture comms 153 accommodates communications with controllers, such as microprocessor 123, sensor(s) 121, and/or other fixtures/devices. The processor 123 may parse commands in order to provide appropriate inputs to algorithms of the algorithms functional area 145.

The algorithms functional area 145 includes beam modulation 155, light output 157, and image generation 159, all of which are inputs into a synthesis function 161. For example, the beam modulation 157 algorithm may facilitate calculation of control settings for elements of the controllable system 111. The light output 157 algorithm may facilitate calculation of drive current settings to be generated by the driver system 113 for each pixel to achieve a desired overall light output. For example, the desired light output may have a desired correlated color temperature (CCT), intensity, and quality, such as color rendering index (CRI), R9 color rating or the like. The image generation 159 algorithms are used to calculate pixel settings to generate an image. The beam shape, light quality and image generation algorithms provide respective output parameter values to the synthesis function 161 algorithms. The synthesis function 161 algorithms use the respective output parameter values of the beam shape, light quality and image generation algorithms to produce the desired overall fixture settings of the lighting device 11. The synthesis function 161 algorithms may utilize time division multiplexing or the like, and may account for time or event based parameter values to implement certain effects, such as fading, contrast enhancement, image blurring or the like.

The pixel level control functional area 147 includes beam steering 163 and drive current 165 functions. For example the beam steering function 163 may allow independent control over individual beam steering elements, and controls may include X, Y or angular directional spatial distribution and/or focus adjustments for each element. Alternatively or in addition, the pixel level control functional area 147 may also control spatial multiplexing of image display and general illumination distribution light output from respective lighting devices. Spatial multiplexing allows a first set of pixels in a lighting device to be controlled to provide a selected image display while a second set of pixels may be controlled to provide a selected general illumination distribution. Similarly, area sharing enables simultaneous generation of light from different areas of the controllable system 111 to generate light for the image display function and the general illumination distribution function respectively. The respective sets of pixels, in response to control signals from a processor, may output light for a selected image display or a selected general illumination distribution.

In some examples (not shown), different configurations of pixel matrices, such as those having different sizes and different numbers of pixels, for the light sources as well as the spatial modulators may be used. The on fixture controls 141 of FIG. 3 as executed by the host processing system 115 and the driver system 113 provide a control function to the controllable system 111. As mentioned above, the controllable system 111 in some examples includes pixel level control at both the light source pixel level and at the spatial modulation level. For example, a first controller may provide light source driver signals while a second controller may provide spatial modulation driver signals, and the first and second controllers are different from one another.

FIG. 4 is a ping-pong chart type signal flow diagram, of an example of a procedure for loading configuration information to a software configurable lighting device 11, in a system like that of FIG. 1. In an initial step S1, a user browses virtual luminaire store 28. For example, a user utilizes mobile device 25 to access server 29 and reviews various luminaires available in the virtual luminaire store, as represented by configuration information files. Although mobile device 25 is referenced for simplicity in some examples, such access may be achieved by the user via laptop 27, LD controller 19 or other user terminal device. If the device 11 has appropriate user input sensing capability, access to store 28 may alternatively use device 11. In step S2, virtual luminaire store 28 presents information about available virtual luminaires to the user. The content may be any suitable format of multimedia information about the virtual luminaires, e.g., text, image, video or audio. While steps S1 and S2 are depicted as individual steps in FIG. 4, no such requirement exists and this is only for simplicity. Alternatively, or in addition, steps S1 and S2 may involve an iterative process wherein the user browses a series of categories and/or sub-categories and virtual luminaire store 28 provides the content of each category and/or sub-category to the user. That is, steps S1 and S2 represent the ability of a user to review data about some number of virtual luminaires available in virtual luminaire store 28 for configuring a software configurable lighting device.

In step S3, the user identifies a particular software configurable lighting device for which a selected configuration information file is to be provided. For example, if the space or area to be illuminated is the user's office, the user identifies one of several lighting devices located in the ceiling or on a wall of that office. In step S4, server 29 queries the particular lighting device 11 to determine a device type, and the particular lighting device 11 responds with the corresponding device type identification.

In one example, software configurable lighting devices include 3 different types of lighting devices. Each different lighting device, for example, utilizes a different driver system 113 and/or a different pixel controllable light generation and spatial distribution system 111. As such, each of the 3 different types of lighting devices may only be configured to represent and/or provide performance for some number of available virtual luminaires (e.g., device type 1 supports x virtual luminaires, device type 2 supports y virtual luminaires and device type 2 supports z virtual luminaires). Thus, in this example, server 29 queries lighting device 11 in step S4 and lighting device 11, in step S5, responds with device type 1, for example.

In step S6, server 29 queries database 31 to identify available virtual luminaires supported by the particular lighting device 11. Such query includes, for example, the device type of the particular lighting device 11. In step S7, the database responds with available virtual luminaires supported by the particular lighting device 11. For example, if particular lighting device 11 is of device type 1, then database 31, in step S7, responds with device type 1 available virtual luminaires. In step S8, server 29 provides corresponding information to the user about those available virtual luminaires supported by particular lighting device 11.

Thus, steps S3-S8 allow a user to be presented with information about image representations and/or performance parameter sets for only those virtual luminaires supported by the particular lighting device that the user is attempting to configure. However, these steps are not the only way for identifying only those virtual luminaires supported by a particular lighting device. In an alternate example, the user may identify the device type as part of step S3 and server 29 may proceed directly to step S6 without performing steps S4-S5.

In still another example, the user may identify the particular lighting device, either with or without a device type, in an initial step (e.g., perform step S3 before step S1). In this way, steps S1 and S2 only include information about image representations and/or performance parameter sets for those available virtual luminaires supported by the identified lighting device and step S8 need not be performed as a separate step. In other words, steps S1-S8 represent only one example of how information describing available virtual luminaires in virtual luminaire store 28 are presented to a user for subsequent selection.

The user, in step S9, utilizes mobile device 25 to select information about an image representation and a performance parameter set for a desired virtual luminaire from among the available virtual luminaires previously presented. For example, if the user desires a particular can light with downlighting, and the appearance and performance for the desired can downlight is supported by lighting device 11, the user selects the desired can downlight in step S9.

It should be noted that the information describing each available virtual luminaire in virtual luminaire store 28 includes an image representing the respective virtual luminaire for display by lighting device 11 as well as performance parameters related to the respective virtual luminaire which influence illumination produced by lighting device 11. While the descriptions of various examples most commonly refer to information about a single virtual luminaire or selection of information about a single virtual luminaire, this is only for simplicity. The virtual luminaire store described herein allows a user to separately select each of the image to be displayed by a software configurable lighting device and the set of performance parameters to control illumination produced by that software configurable lighting device. As such, although not explicitly depicted in FIG. 4 or described above in relation to steps S1-S9, the user, for example, may select an image representing a first virtual luminaire and select performance parameters corresponding to a different virtual luminaire as part of step S9. Alternatively, or in addition, the virtual luminaire store may allow a user to provide an additional image or otherwise customize an existing image. Virtual luminaire store 28 may also allow the user to define or otherwise customize the set of performance parameters to be delivered to the software configurable lighting device.

It should also be noted that, while lighting device 11 most often can display any image to represent any selected virtual luminaire appearance, lighting device 11 may not be able to perform or otherwise operate in accordance with all of the performance parameters corresponding to the selected virtual luminaire, e.g. can show downlight but may not be able to angle light far enough to one side to perform a wall wash function in a particular office. As such, the user, as part of step S9, may select information about an image representation for a first virtual luminaire and, separately, select information about a performance parameter set for either the first virtual luminaire or a different virtual luminaire, including a previously customized or user-provided performance parameter set.

In step S10, server 29 requests the corresponding information about the selected image representation and the selected set of performance parameters from database 31 in order to obtain a corresponding configuration information file. Database 31, in step S11, provides the requested information to server 29. As noted previously, lighting device 11 may be one particular type of multiple different types of software configurable lighting devices usable in systems such as 10 and supported by the virtual luminaire store 28. The selected configuration information may be different for each different type of software configurable lighting device (e.g., a first type may support an image representation of one format while a second type may not support the same image representation format, a first type may support a first set of performance parameters while a second type may support a second set of performance parameters to achieve similar illumination results). In one example, database 31 maintains different configuration information corresponding to each different type of software configurable lighting device; and, as part of step S11, database 31 provides the appropriate corresponding configuration information. Alternatively, database 31 maintains common or otherwise standardized configuration information; and, after receiving the requested configuration information from database 31, server 29 may manipulate or otherwise process the received configuration information in order to obtain a configuration information file corresponding to the type of the particular lighting device 11 intended to currently receive the configuration information. In this way, server 29 obtains a file of suitable configuration information including information about the selected image representation and the selected set of performance parameters.

Server 29, in step S12, transfers the configuration information file to the particular lighting device 11. For example, server 29 utilizes network(s) 23 and/or network 17 to communicate the configuration information file directly to lighting device 11. Alternatively, or in addition, server 29 may deliver the configuration information file to a user terminal (e.g., mobile device 25 or laptop 27) and the user terminal may, in turn, deliver the file to lighting device 11. In still another example, server 29 transfers the configuration information file to LD controller 19 which, in turn, uploads or otherwise shares the configuration information file with lighting device 11.

In step S13, lighting device 11 receives the configuration information file and stores the received file in memory (e.g., memory/storage 125). Once lighting device 11 has successfully received and stored the selected configuration information file, lighting device 11 provides an acknowledgement to server 29 in step S14. In turn, server 29 provides a confirmation of the transfer to the user via mobile device 25 in step S15. In this way, a user is able to select a desired virtual luminaire from a virtual luminaire store and have the corresponding configuration information file delivered to the identified lighting device.

While the discussion of FIG. 4 focused on delivering a single configuration information file to a single lighting device, this is only for simplicity. The resulting configuration information file may be delivered to one or more additional lighting devices in order to implement the same configuration on the additional lighting devices. For example, a user may elect to have steps S13-S15 repeated some number of times for a corresponding number of additional lighting devices. Alternatively, or in addition, the various steps of FIG. 4 may be repeated such that different configuration information files are delivered to different lighting devices. As such, a single configuration information file may be delivered to some number of software configurable lighting devices while a different configuration information file is delivered to a different number of lighting devices and still another configuration information file is delivered to yet a further number of lighting devices. In this way, the virtual luminaire store represents a repository of virtual luminaires which may be implemented by one or more software configurable lighting devices.

Other aspects of the virtual luminaire store not shown may include accounting, billing and payment collection. For example, virtual luminaire store 28 may maintain records related to the type and/or number of configuration information files transmitted to software configurable lighting devices 11 at different premises 15 and/or owned or operated by different customers. Such records may include a count of different lighting devices receiving configuration information files, a count of how many times the same lighting device receives the same or a different configuration information file, a count of times each image representing a virtual luminaire is selected, a count of times each set of performance parameters is selected, as well as various other counts or other information related to selection and delivery of configuration information files. In this way, virtual luminaire store 28 may provide an accounting of how the store is being utilized.

In a further example, a value is associated with each configuration information file or each component included within the file (e.g., a value associated with each image and a value associated with each set of performance parameters). The associated value may be the same for all configuration information files (or each included component) or the associated value may differ for each configuration information file (or each included component). While such associated value may be monetary in nature, the associated value may alternatively represent non-monetary compensation. In this further example, virtual luminaire store 28 is able to bill for each transmitted configuration information file (or each included component); and the operator of the store can collect payment based on a billed amount. In conjunction with the accounting described above, such billing and payment collection may also vary based on historical information (e.g., volume discount, reduced value for subsequent transmission of the same configuration information file to a different lighting device, free subsequent transmission of the same configuration information file to the same lighting device, etc.). In this way, virtual luminaire store 28 may allow an individual or organization operating the store to capitalize on the resources contained within the store.

The control functionality shown is FIG. 3 will now be discussed in more detail with reference to FIG. 5. FIG. 5 is a block diagram of an example of the pixel controllable light generation and spatial light distribution system 300. In the example of FIG. 5, the spatial modulation component is integrated with light sources within the pixel elements of the matrix in the pixel controllable light generation and spatial distribution matrix 311. In other words, the lighting device 11 has pixel level integration of light generation and spatial distribution capabilities and functions in a pixel controllable light generation and spatial distribution 311. The light generation and spatial distribution components and functions may be integrated at board or chip level. For example, both display functions and beam steering capabilities may be integrated on-chip. As a result, in an example, the driver system 113 may also be integrated into the pixel controllable light generation and spatial distribution 311. In such an implementation, the integrated pixel control driver 313 is an integrated controller providing matrix drive signals for image generation and spatial light modulation. The integrated pixel control driver 313 may receive signals from an external source such as the host processor system of FIG. 2 or the like. The integrated pixel control driver 313 is coupled to processor, such as a host processing system 115, and receives commands based on image selections and/or spatial distribution selections from the microprocessor 123. In such an implementation as shown in FIG. 5, the pixel controllable light generation and spatial distribution matrix 311 responds to control signals received from the integrated pixel control driver 313 to generate distributed light. The generated distributed light presenting an image and a selected light distribution. In an example, the integrated pixel control driver 313 receives commands for driving the pixel controllable light generation and spatial distribution matrix 311 based on image selections from a controller, such as microprocessor 123 of FIG. 1. A selected image, for example, may correspond to a displayable representation of a selected lighting device or any image. The selected lighting device image may be an actual physical lighting device or an artist's/engineer's design for a lighting device that may not exist in the physical world. Similarly, the selected image may be an image of a real scene or a computer generated image.

An approach to developing a configurable luminaire might utilize a display as the light source, e.g. with enhancements to improve illumination performance. For example in the system 300, an LCD type display device with a backlight type light generation source, for example, might be improved by modifications of the light generation source. The source might be modified/supplemented to increase the intensity of available light. For example, the number of light sources, whether using known types of back-lighting lamps or direct-lighting LEDs including organic LEDs (OLEDs), can be increased to increase the light output from the configurable luminaire when providing general illumination. Also, modifications may be made to the components or layers of the LCD type display device to increase the light output efficiency of LCD-type display. For example, the diffuser and/or polarizers used in a typical LCD-type display may be replaced with switchable diffusers and/or polarizers that enable the light output from the LCD-type display to be used for general illumination.

Other approaches are also envisioned, for example, the various techniques for increasing the intensity of available light output from plasma sources, such as modifying the electrode design, modifying cell shape and/or volume, changing the gas mixture or replacing the phosphor of cells may be used to provide suitable general illumination.

Another display enhancement might provide broader/smoother spectrum white light from the backlight type light generation source (e.g. instead of a source that provides fairly intense red, green and blue spikes in the spectrum of generated light). With such source enhancements, a driver, such as driver 313, might control the LCD elements, such as the switchable diffuser and/or polarizers, of the display in the pixel controllable light generation array 311 to generate an image of a light fixture or the like, with high intensity and/or high quality white light output in regions of the image corresponding to the distributed light output of the represented light fixture. Other areas of the displayed image might represent typical examples of material(s) around the fixture, e.g. a portion of a ceiling tile. Another lighting approach might use time division multiplexed control of the backlight type light generation source, for example, to provide appropriate intensity and/or color of light for image display in a first period of a recurring cycle for image display and a high intensity and/or high quality white light output in another period of each recurring cycle when the enhanced display, such as system 300, is to generate and output light for the illumination function.

The above-mentioned display enhancements may also be provided using a simpler mechanical approach that utilizes interchangeable films/diffusers/translucent sheets that are mechanically inserted and removed from in front of one of the above examples of an enhanced display. The interchangeable films/diffusers/translucent sheets may provide spatial modulation effects based on the selected general illumination distribution, or to provide an image effect on a displayed virtual luminaire image. For example, a system of rollers (not shown) may be used to move the interchangeable films/diffusers/translucent sheets to provide the selected lighting distribution or image effect.

In another example, the pixel controllable light generation and spatial modulation matrix 311 of FIG. 5 may be configured as an enhanced display having a light generation source for providing a selected image effect surrounded by another light generation source that provides light that is processed, for example, via spatial modulation, to provide a selected lighting distribution. For example, a lighting device may have a first light generation array that provides an image display with a bezel having a second light generation array that provides general illumination.

Figure 6:
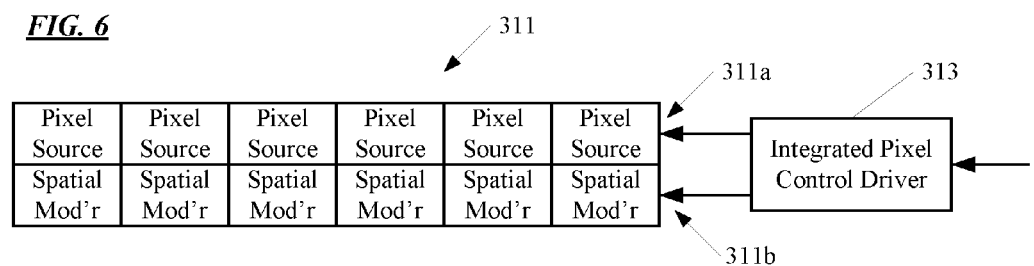

FIG. 6 is a somewhat more detailed illustration of an example of the pixel controllable light generation and spatial light distribution system and the associated driver. In the illustrated example of FIG. 6, the pixel controllable light generation and spatial distribution matrix 311 is divided into two separate pixel matrices 311a and 311b. As shown in the example of FIG. 6, the respective pixel matrices 311a and 311b are shown with the same pixel size/numbers for both individual pixel light sources and the individual spatial modulators. Of course, other examples may have different pixel matrix (different size and number) for the respective light source matrix and spatial modulators matrix. The example of FIG. 6 is similar to the example of FIG. 5 in that control signals are provided by the integrated pixel control driver 313, however, in the example of FIG. 6, control signals are provided to each of the respective matrices 311a and 311b. The integrated pixel control driver 313 of FIG. 6 provides image display control signals to the pixel light sources in the pixel light source matrix 311a and general illumination distribution control signals to the spatial modulator pixel array 311b. For example, the pixel light source of the controllable system 311 is electrically controllable via the driver 313 with respect to light output parameters, such as light intensity and light color characteristics. Light color characteristics, for example, include different proportions of various light from each sub-pixel light source, such as red, green, blue and/or white light emitting diodes, as well as grayscale and/or monochromatic lighting effects.

As can be seen from FIGS. 5-6 and the corresponding descriptions, the pixel controllable light generation and spatial light distribution system, as well as the associated driver, may be implemented in any number of different ways. The examples presented herein are only two high level examples and are not meant to limit the ability of the software configurable lighting device to display an image and operate in accordance with a set of performance parameters, as described elsewhere herein.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

As shown by the above discussion, functions relating to virtual luminaire store 28 may be implemented on computers connected for data communication via the components of a packet data network, operating as a LAN and/or as a WAN as shown in FIG. 1. Although special purpose devices may be used, such devices also may be implemented using one or more hardware platforms intended to represent a general class of user's data processing device commonly used to run "client" programming and/or a general class of data processing device commonly used to run "server" programming. The user device running client programming may correspond to mobile device 25 or laptop 27 of FIG. 1 whereas the server computer may be configured to implement functions of virtual luminaire store 28 discussed above.

As known in the data processing and communications arts, a general-purpose computing device, computer or computer system typically comprises a central processor or other processing device, internal data connection(s), various types of memory or storage media (RAM, ROM, EEPROM, cache memory, disk drives etc.) for code and data storage, and one or more network interfaces for communication purposes. The software functionalities involve programming, including executable code as well as associated stored data, e.g. files used for the luminaire store service/function(s). The software code is executable by the general-purpose computer that functions as the luminaire store server (e.g., server 29 in FIG. 1) and/or that functions as a user terminal device (e.g., mobile device 25 or laptop 27 in FIG. 1). In operation, the code is stored within the general-purpose computer platform. At other times, however, the software may be stored at other locations and/or transported for loading into the appropriate general-purpose computer system. Execution of such code by a processor of the computer platform enables the platform to implement the methodology for providing a selected configuration information file to a software configurable lighting device from a luminaire store, in essentially the manner performed in the implementations discussed and illustrated herein. Although those skilled in the art likely are familiar with the structure, programming and general operation of such computer systems, it may be helpful to consider some high-level examples.

Figure 7:
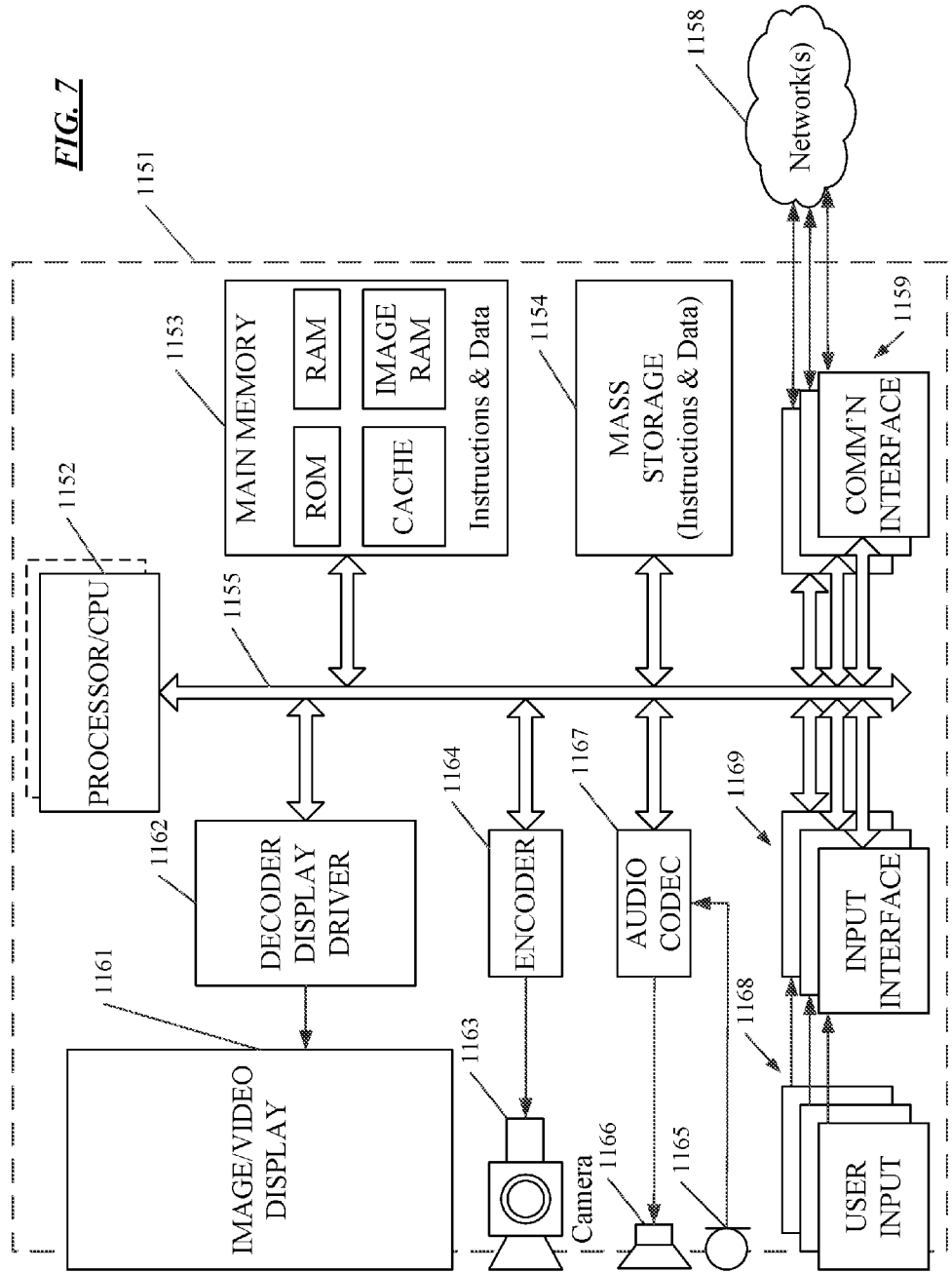
FIG. 7 is a simplified functional block diagram of a personal computer or other work station or terminal device.
Figure 8:
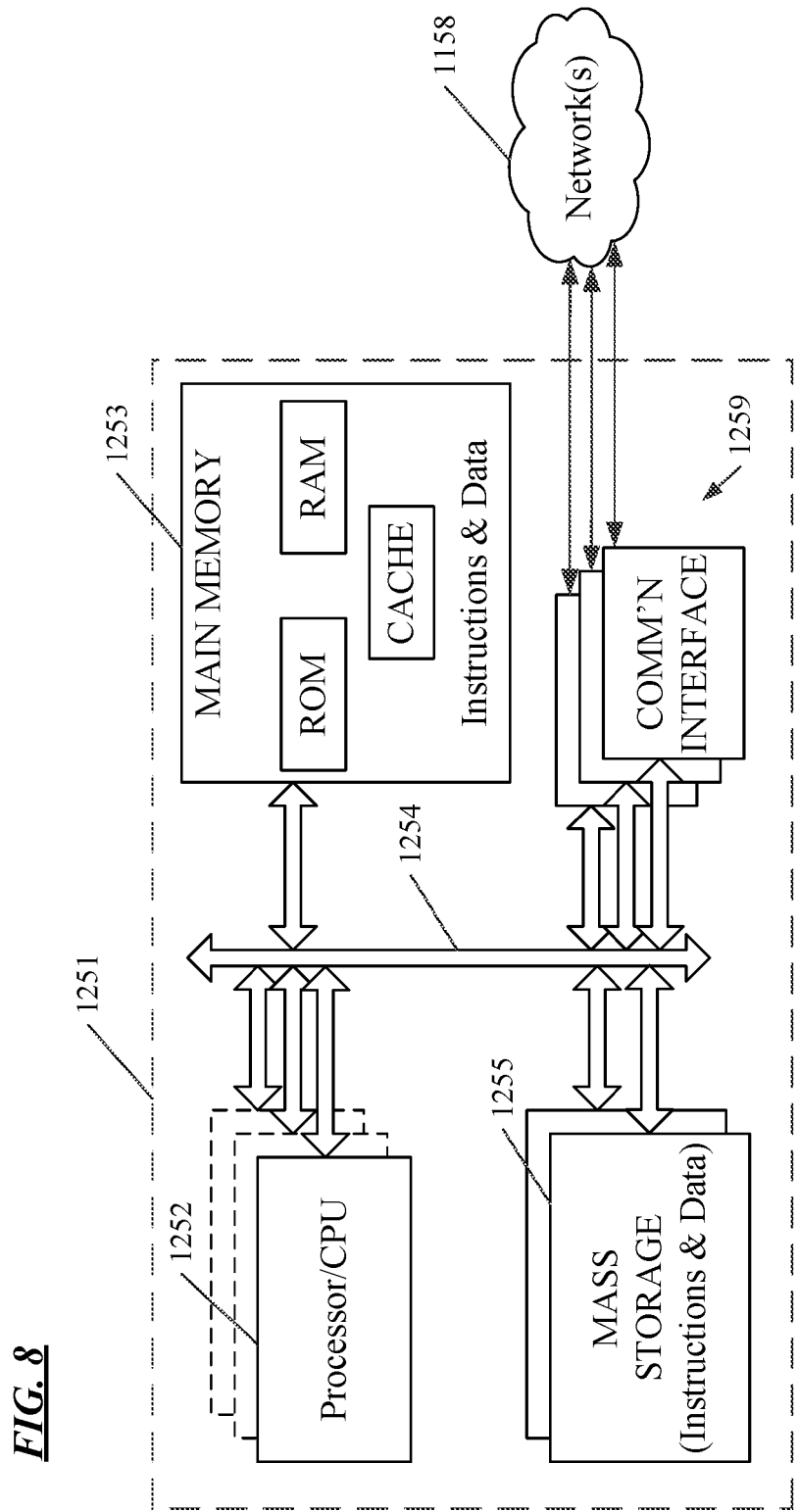
FIG. 8 is a simplified functional block diagram of a computer that may be configured as a host or server, for example, to function as the virtual luminaire store server in the system of FIG. 1.

FIGS. 7 and 8 provide functional block diagram illustrations of general purpose computer hardware platforms. FIG. 7 depicts a computer with user interface elements, as may be used to implement a client computer or other type of work station or terminal device, although the computer of FIG. 7 may also act as a host or server if appropriately programmed. FIG. 8 illustrates a network or host computer platform, as may typically be used to implement a server.

With reference to FIG. 7, a user device type computer system 1151, which may serve as the user terminal (e.g., mobile device 25 or laptop 27), includes processor circuitry forming a central processing unit (CPU) 1152. The circuitry implementing the CPU 1152 may be based on any processor or microprocessor architecture such as a Reduced instruction set computing (RISC) using an ARM architecture, as commonly used today in mobile devices and other portable electronic devices, or a microprocessor architecture more commonly used in computers such as an instruction set architecture (ISA) or Complex instruction set computing (CISC) architecture. The CPU 1152 may use any other suitable architecture. Any such architecture may use one or more processing cores. The CPU 1152 may contain a single processor/microprocessor, or it may contain a number of microprocessors for configuring the computer system 1152 as a multi-processor system.

The computer system 1151 also includes a main memory 1153 that stores at least portions of instructions for execution by and data for processing by the CPU 1152. The main memory 1153 may include one or more of several different types of storage devices, such as read only memory (ROM), random access memory (RAM), cache and possibly an image memory (e.g. to enhance image/video processing). Although not separately shown, the memory 1153 may include or be formed of other types of known memory/storage devices, such as PROM (programmable read only memory), EPROM (erasable programmable read only memory), FLASH-EPROM, or the like.

The system 1151 also includes one or more mass storage devices 1154. Although a storage device 1154 could be implemented using any of the known types of disk drive or even tape drive, the trend is to utilize semiconductor memory technologies, particularly for portable or handheld system form factors. As noted, the main memory 1153 stores at least portions of instructions for execution and data for processing by the CPU 1152. The mass storage device 1154 provides longer term non-volatile storage for larger volumes of program instructions and data. For a personal computer, or other similar device example, the mass storage device 1154 may store the operating system and application software as well as content data, e.g. for uploading to main memory and execution or processing by the CPU 1152. Examples of content data include messages and documents, and various multimedia content files (e.g. images, audio, video, text and combinations thereof). Depending on the procedure for loading configuration files into lighting devices, one or more such files may be stored at least for a time in storage device 1154 and/or memory 1153. Instructions and data can also be moved from the CPU 1152 and/or memory 1153 for storage in device 1154.

The processor/CPU 1152 is coupled to have access to the various instructions and data contained in the main memory 1153 and mass storage device 1154. Although other interconnection arrangements may be used, the example utilizes an interconnect bus 1155. The interconnect bus 1155 also provides internal communications with other elements of the computer system 1151.

The system 1151 also includes one or more input/output interfaces for communications, shown by way of example as several interfaces 1159 for data communications via a network 1158. The network 1158 may be or communicate with the network 17 or network(s) 23 of FIG. 1. Although narrowband modems are also available, increasingly each communication interface 1159 provides a broadband data communication capability over wired, fiber or wireless link. Examples include wireless (e.g. WiFi) and cable connection Ethernet cards (wired or fiber optic), mobile broadband 'aircards,' and Bluetooth access devices. Infrared and visual light type wireless communications are also contemplated. Outside the system 1151, the interface provides communications over corresponding types of links to the network 1158. In the example, within the system 1151, the interfaces communicate data to and from other elements of the system via the interconnect bus 1155.

For operation as a user terminal device, the computer system 1151 further includes appropriate input/output devices and interface elements. The example offers visual and audible inputs and outputs, as well as other types of inputs. Although not shown, the system may also support other types of output, e.g. via a printer. The input and output hardware devices are shown as elements of the device or system 1151, for example, as may be the case if the computer system 1151 is implemented as a portable computer device (e.g. laptop, notebook or ultrabook), tablet, smartphone or other handheld device. In other implementations, however, some or all of the input and output hardware devices may be separate devices connected to the other system elements via wired or wireless links and appropriate interface hardware.

For visual output, the computer system 1151 includes an image or video display 1161 and an associated decoder and display driver circuit 1162. The display 1161 may be a projector or the like but typically is a flat panel display, such as a liquid crystal display (LCD). The decoder function decodes video or other image content from a standard format, and the driver supplies signals to drive the display 1161 to output the visual information. The CPU 1152 controls image presentation on the display 1161 via the display driver 1162, to present visible outputs from the device 1151 to a user, such as application displays and displays of various content items (e.g. still images, videos, messages, documents, and the like).

In the example, the computer system 1151 also includes a camera 1163 as a visible light image sensor. Various types of cameras may be used. The camera 1163 typically can provide still images and/or a video stream, in the example to an encoder 1164. The encoder 1164 interfaces the camera to the interconnect bus 1155. For example, the encoder 164 converts the image/video signal from the camera 1163 to a standard digital format suitable for storage and/or other processing and supplies that digital image/video content to other element(s) of the system 1151, via the bus 1155. Connections to allow the CPU 1152 to control operations of the camera 1163 are omitted for simplicity.

In the example, the computer system 1151 includes a microphone 1165, configured to detect audio input activity, as well as an audio output component such as one or more speakers 1166 configured to provide audible information output to the user. Although other interfaces may be used, the example utilizes an audio coder/decoder (CODEC), as shown at 1167, to interface audio to/from the digital media of the interconnect bus 1155. The CODEC 1167 converts an audio responsive analog signal from the microphone 1165 to a digital format and supplies the digital audio to other element(s) of the system 1151, via the bus 1155. The CODEC 1167 also receives digitized audio via the bus 1155 and converts the digitized audio to an analog signal which the CODEC 1167 outputs to drive the speaker 1166. Although not shown, one or more amplifiers may be included to amplify the analog signal from the microphone 1165 or the analog signal from the CODEC 1167 that drives the speaker 1166.

Depending on the form factor and intended type of usage/applications for the computer system 1151, the system 1151 will include one or more of various types of additional user input elements, shown collectively at 1168. Each such element 1168 will have an associated interface 1169 to provide responsive data to other system elements via bus 1155. Examples of suitable user inputs 1168 include a keyboard or keypad, a cursor control (e.g. a mouse, touchpad, trackball, cursor direction keys etc.).

Another user interface option provides a touchscreen display feature. At a high level, a touchscreen display is a device that displays information to a user and can detect occurrence and location of a touch on the area of the display. The touch may be an actual touch of the display device with a finger, stylus or other object; although at least some touchscreens can also sense when the object is in close proximity to the screen. Use of a touchscreen display as part of the user interface enables a user to interact directly with the information presented on the display. The display may be essentially the same as discussed above relative to element 1161 as shown in the drawing. For touch sensing, however, the user inputs 1168 and interfaces 1169 would include a touch/position sensor and associated sense signal processing circuit. The touch/position sensor is relatively transparent, so that the user may view the information presented on the display 1161. The sense signal processing circuit receives sensing signals from elements of the touch/position sensor and detects occurrence and position of each touch of the screen formed by the display and sensor. The sense circuit provides touch position information to the CPU 1152 via the bus 1155, and the CPU 1152 can correlate that information to the information currently displayed via the display 1161, to determine the nature of user input via the touchscreen.

A mobile device type user terminal may include elements similar to those of a laptop or desktop computer, but will typically use smaller components that also require less power, to facilitate implementation in a portable form factor. Some portable devices include similar but smaller input and output elements. Tablets and smartphones, for example, utilize touch sensitive display screens, instead of separate keyboard and cursor control elements.

Each computer system 1151 runs a variety of applications programs and stores data, enabling one or more interactions via the user interface, provided through elements, and/or over the network 1158 to implement the desired user device processing for the luminaire store service or the processing of data for luminaire store services. The user computer system/device 1151, for example, runs a general purpose web browser application and/or a separate luminaire store application program.

Turning now to consider a server or host computer, FIG. 8 is a functional block diagram of a general-purpose computer system 1251, which may perform the functions of the virtual luminaire store server 29, a server for storage of the database 31, or the like.

The example 1251 will generally be described as an implementation of a server computer, e.g. as might be configured as a blade device in a server farm. Alternatively, the computer system may comprise a mainframe or other type of host computer system capable of web-based communications, media content distribution, or the like via the network 1158. Although shown as the same network as served the user computer system 1151, the computer system 1251 may connect to a different network.

The computer system 1251 in the example includes a central processing unit (CPU) 1252, a main memory 1253, mass storage 1255 and an interconnect bus 1254. These elements may be similar to elements of the computer system 1151 or may use higher capacity hardware. The circuitry forming the CPU 1252 may contain a single microprocessor, or may contain a number of microprocessors for configuring the computer system 1252 as a multi-processor system, or may use a higher speed processing architecture. The main memory 1253 in the example includes ROM, RAM and cache memory; although other memory devices may be added or substituted. Although semiconductor memory may be used in the mass storage devices 1255, magnetic type devices (tape or disk) and optical disk devices typically provide higher volume storage in host computer or server applications. In operation, the main memory 1253 stores at least portions of instructions and data for execution by the CPU 1252, although instructions and data are moved between memory and storage and CPU via the interconnect bus in a manner similar to transfers discussed above relative to the system 1151 of FIG. 7. The mass storage device may store an instance of some or all of the virtual luminaire store database 31 or that database may reside on a peripheral storage device or another computer in communication with system 1251.

The system 1251 also includes one or more input/output interfaces for communications, shown by way of example as interfaces 1259 for data communications via the network 1158. Each interface 1259 may be a high-speed modem, an Ethernet (optical, cable or wireless) card or any other appropriate data communications device. To provide the luminaire store service to a large number of users' client devices, the interface(s) 1259 preferably provide(s) a relatively high-speed link to the network 1158. The physical communication link(s) may be optical, wired, or wireless (e.g., via satellite or cellular network).

Although not shown, the system 1251 may further include appropriate input/output ports for interconnection with a local display and a keyboard or the like serving as a local user interface for configuration, programming or troubleshooting purposes. Alternatively, the server operations personnel may interact with the system 1251 for control and programming of the system from remote terminal devices via the Internet or some other link via network 1158.

The computer system 1251 runs a variety of applications programs and stores the database 31 for the virtual luminaire store service. One or more such applications enable the delivery of web pages or other forms of multimedia web content and/or the generation of e-mail messages for providing information, such as information corresponding to available virtual luminaires within the virtual luminaire store described above. The web pages include a combination of content for presentation to a user and instructions related to formatting the content. Those skilled in the art will recognize that the computer system 1251 may run other programs and/or host other web-based or e-mail based services. As such, the system 1251 need not sit idle while waiting for luminaire store service related functions. In some applications, the same equipment may offer both the specific luminaire store service described herein as well as one or more other services.

The example (FIG. 8) shows a single instance of a computer system 1251. Of course, the server or host functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like 1151, 1251 generally are conventional in nature, and it is presumed that those skilled in the art are sufficiently familiar therewith to understand implementation of the present luminaire store technique using suitable configuration and/or programming of such computer system(s) particularly as outlined above relative to 1151 of FIG. 7 and 1251 of FIG. 8.

Hence, aspects of the methods of selecting a configuration information file for delivery to a software configurable lighting device outlined above may be embodied in programming, e.g. in the form of software, firmware, or microcode executable by a user computer system, a server computer or other programmable device. Other aspects may be embodied in downloaded/installed configuration information files. Program and/or file aspects of the technology may be thought of as "products" or "articles of manufacture" typically in the form of executable code and/or associated configuration data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the executable software or file containing configuration information may at times be communicated through the Internet or various other telecommunication networks. Such communications, for example, may enable loading of the software from one computer or processor into another, for example, from a management server or host computer into the computer platform of the server 29 that will be the virtual luminaire store server and/or the computer platform of the user that will be the client device for virtual luminaire store services. As another example, communications may enable loading of a file of a selected virtual luminaire configuration from a device 19, 25, or 27 into a software configurable lighting device 11. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the server 29, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
    a software configurable lighting device, comprising:
    (a) a light generation and distribution system configurable at a pixel level with respect to light output parameters comprising: (1) light intensity, (2) light color characteristic, and (3) spatial modulation;
    (b) a memory configured to store lighting device configuration information;
    (c) a programmable controller, coupled to the light generation and distribution system and to have access to the memory, configured to set the light output parameters in accordance with data processed by the programmable controller, in accordance with a selected lighting device configuration information from the memory; and
    (d) a first communication interface coupled to the programmable controller supporting data communication through a network;
    a computer comprising:
    (i) a processor; and
    (ii) a second communication interface coupled to the processor supporting data communication through the network; and
    a database of lighting device configuration data accessible to the processor of the computer,
    wherein the processor of the computer is configured to cause the computer to perform operations, including a first operation to load a subset or all of the lighting device configuration data from the database, including the selected lighting device configuration information, into the memory of the software configurable lighting device, and the selected lighting device configuration information comprises an image and at least one pixel level setting for at least one of beam distribution or beam shaping.

2. The system of claim 1, wherein the processor of the computer is further configured to cause the computer to perform operations, including operations to:
    send data, through the network to a terminal device, about lighting device configurations corresponding to the database, for presentation by the terminal device to a user;
    receive a user's selection from the terminal device through the network; and
    select the subset or all of the lighting device configuration data from the database based on the received user's selection, for the first operation to load the subset or all of the lighting device configuration data into the memory of the software configurable lighting device.

3. The system of claim 1, wherein:
the programmable controller is programmed to operate the lighting device to perform functions, including functions to:
obtain the image and the at least one pixel level setting as software control data, from the selected lighting device configuration information;
operate the light generation and distribution system to present a display output, based on the image; and
emit light for general illumination having a light distribution, based on the at least one pixel level setting.

4. The system of claim 3, wherein:
the display output, based on the image, is a representation of a luminaire; and
the light distribution, based on the at least one pixel level setting corresponds to light distribution outputted from the represented luminaire.

5. The system of claim 3, wherein:
the display output, based on the image, is unrelated to and independent of the light distribution, based on the at least one pixel level setting.

6. The system of claim 1, wherein:
the light generation and distribution system comprises a pixel controllable light generation and pixel controllable spatial light distribution system;
the software configurable lighting device further comprises a driver coupled to the light generation and distribution system, configured to control at a pixel level light generation by the light generation and distribution system and to control at a pixel level spatial distribution of the generated light; and
the programmable controller comprises another processor having access to the memory and coupled to control operation of the driver, and programming in the memory, wherein execution of the programming by the another processor configures the lighting device to perform the setting of the light output parameters in accordance with the selected lighting device configuration information from the memory.

7. The system of claim 6, wherein:
the pixel controllable light generation and pixel controllable spatial light distribution system comprises a pixel spatial light modulator optically coupled to process the generated light; and
each pixel of the pixel spatial light modulator comprises a light scattering based beam shaping device selected from one or more of electro-chromic materials, an electrophoretic ink, polymer dispersed liquid crystals, or polymer stabilized cholesteric texture liquid crystals.

8. An article of manufacture, comprising:
a non-transitory machine readable medium; and
lighting device configuration information embodied in the non-transitory machine readable medium, the lighting device configuration information including an image for display by the lighting device and at least one pixel level setting for at least one of beam distribution or beam shaping by the lighting device to configure a software configurable lighting device to set light output parameters comprising: (1) light intensity, (2) light color characteristic and (3) spatial modulation, in accordance with the lighting device configuration information.

9. A method comprising steps of:
receiving at a computer configured as a server, via a communication network, a selection of a lighting device configuration;
based on the received selection, obtaining lighting device configuration information from among a database of lighting device configuration data, comprising data to set the light output parameters of a software configurable lighting device with respect to (1) light intensity, (2) light color characteristic and (3) spatial modulation; and
transmitting the obtained lighting device configuration data from the server computer through the communication network for loading into the software configurable lighting device,
wherein the data to set the light output parameters in the obtained lighting device configuration information comprises an image for display by the lighting device and at least one pixel level setting for at least one of beam distribution or beam shaping.

10. A computer programmed to implement the method of claim 9.

11. An article of manufacture, comprising:
a non-transitory machine readable medium; and
programming embodied in the non-transitory machine readable medium, wherein execution of the programming by a computer configures the computer to implement functions, including functions to:
receive, via a communication network, a selection of a lighting device configuration;
based on the received selection, obtain a lighting device configuration information from among a database of lighting device configuration data, comprising data to set the light output parameters of a software configurable lighting device with respect to (1) light intensity, (2) light color characteristic and (3) spatial modulation; and
transmit the obtained lighting device configuration information from a server computer through the communication network for loading into the software configurable lighting device,
wherein the data to set the light output parameters in the obtained lighting device configuration information comprises an image for display by the lighting device and at least one pixel level setting for at least one of beam distribution or beam shaping.

12. A method comprising steps of:
receiving, via a communication network, in a software configurable lighting device, a lighting device configuration information comprising data to set the light output parameters of a software configurable lighting device with respect to (1) light intensity, (2) light color characteristic and (3) spatial modulation;
storing the received lighting configuration information in a memory of the software configurable lighting device; and
setting the light output parameters of the software configurable lighting device in accordance with the data in the lighting device configuration information stored in the memory,
wherein the data to set the light output parameters in the lighting device configuration information comprises an image for display by the lighting device and at least one pixel level setting for at least one of beam distribution or beam shaping.

13. A software configurable lighting device programmed to implement the method of claim 12.

14. An article of manufacture, comprising:

a non-transitory machine readable medium; and programming embodied in the non-transitory machine readable medium, wherein execution of the programming by a processor of a software configurable lighting device configures the software configurable lighting device to implement functions, including functions to:

receive, via a communication network, a lighting device configuration information comprising data to set the light output parameters of a software configurable lighting device with respect to (1) light intensity, (2) light color characteristic and (3) spatial modulation;

store the received lighting device configuration information in a memory of the software configurable lighting device; and set the light output parameters of the software configurable lighting device in accordance with the lighting device configuration information stored in the memory, wherein the data to set the light output parameters in the lighting device configuration information comprises an image for display by the lighting device and at least one pixel level setting for at least one of beam distribution or beam shaping.

\* \* \* \* \*